(12) United States Patent
Kamon et al.

(10) Patent No.: US 11,833,698 B2
(45) Date of Patent: Dec. 5, 2023

(54) VISION SYSTEM FOR A ROBOT

(71) Applicant: KAWASAKI JUKOGYO KABUSHIKI KAISHA, Kobe (JP)

(72) Inventors: Masayuki Kamon, Akashi (JP); Hirokazu Sugiyama, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/273,235

(22) PCT Filed: Aug. 30, 2019

(86) PCT No.: PCT/JP2019/034227
§ 371 (c)(1),
(2) Date: Mar. 3, 2021

(87) PCT Pub. No.: WO2020/050179
PCT Pub. Date: Mar. 12, 2020

(65) Prior Publication Data
US 2021/0323165 A1 Oct. 21, 2021

(30) Foreign Application Priority Data
Sep. 3, 2018 (JP) .................................. 2018-164779

(51) Int. Cl.
*B25J 9/16* (2006.01)
*G06T 3/40* (2006.01)
(Continued)

(52) U.S. Cl.
CPC ............... *B25J 9/1697* (2013.01); *G06T 3/40* (2013.01); *G06T 5/006* (2013.01); *H04N 3/30* (2013.01);
(Continued)

(58) Field of Classification Search
None
See application file for complete search history.

(56) References Cited

U.S. PATENT DOCUMENTS 5,684,531 A * 11/1997 Li .......................... G01C 3/085
382/153
8,475,377 B2 * 7/2013 Angott ................. A61B 5/0075
600/437

(Continued)

FOREIGN PATENT DOCUMENTS

JP H06-292240 A 10/1994
JP H08-009423 A 1/1996
(Continued)

OTHER PUBLICATIONS

"Key Points of the 2015 White Paper on Information and Communications in Japan," the Japanese Ministry of Internal Affairs and Communications, 2015.

*Primary Examiner* — Tyler W. Sullivan
(74) *Attorney, Agent, or Firm* — Oliff PLC

(57) ABSTRACT

A vision system includes a robot body and a robot operation manipulator that receives inputs from an operator to manipulate the robot body. The vision system also includes a left-eye and right-eye cameras, and a display that displays parallax images for an operator. The vision system further includes an area operation manipulator that receives inputs by the operator to specify a target area to be seen three-dimensionally through the parallax images displayed on the display. The target area is located in an absolute space and is included in a portion of a field of view common between the left-eye and right-eye cameras. The vision system further includes a first controller that controls operation of the robot body, and a second controller that extracts and displays, as parallax images, images corresponding to the target area
(Continued)

from a left-eye and right-eye capturing images captured by the left-eye and right-eye cameras, respectively.

6 Claims, 6 Drawing Sheets

(51) Int. Cl.
  *H04N 13/275*    (2018.01)
  *H04N 13/30*    (2018.01)
  *H04N 13/344*    (2018.01)
  *H04N 13/239*    (2018.01)
  *G06T 5/00*    (2006.01)
  *H04N 3/30*    (2006.01)

(52) U.S. Cl.
  CPC ......... *H04N 13/239* (2018.05); *H04N 13/275* (2018.05); *H04N 13/344* (2018.05)

(56) References Cited

U.S. PATENT DOCUMENTS

| | | | |
|---|---|---|---|
| 9,283,680 B2* | 3/2016 | Yasuda | G06V 20/64 |
| 9,392,258 B2* | 7/2016 | Rappel | H04N 13/204 |
| 2011/0122232 A1 | 5/2011 | Hoshino | |
| 2011/0234584 A1 | 9/2011 | Endo | |
| 2012/0095619 A1* | 4/2012 | Pack | G05D 1/0274 |
| | | | 701/2 |
| 2014/0005484 A1* | 1/2014 | Charles | A61B 17/00 |
| | | | 600/201 |
| 2016/0165130 A1 | 6/2016 | Cleveland | |
| 2017/0099433 A1* | 4/2017 | Cleveland | H04N 23/90 |
| 2018/0222056 A1* | 8/2018 | Suzuki | B25J 9/0096 |
| 2019/0187477 A1* | 6/2019 | Fujimaki | G05B 19/042 |
| 2019/0290371 A1* | 9/2019 | Calef | A61B 34/30 |
| 2019/0355148 A1* | 11/2019 | Horita | G03B 15/00 |
| 2020/0084423 A1* | 3/2020 | Yamamoto | H04N 23/695 |

FOREIGN PATENT DOCUMENTS

| | | |
|---|---|---|
| JP | H09-327044 A | 12/1997 |
| JP | 2001-039398 A | 2/2001 |
| JP | 2002-354505 A | 12/2002 |
| JP | 2011-114547 A | 6/2011 |
| JP | 2011-205358 A | 10/2011 |
| JP | 2013-36243 A | 2/2013 |
| JP | 2015-521913 A | 8/2015 |
| WO | 2014/004717 A2 | 1/2014 |
| WO | WO-2019210322 A1 * | 10/2019 ............ A61B 34/30 |

* cited by examiner

VISION SYSTEM FOR A ROBOT

TECHNICAL FIELD

The present disclosure relates to a robot system.

BACKGROUND ART

Technologies in which an operator remotely manipulates a manipulator while watching a work target object displayed on a stereoscopic display unit are known (e.g., see Patent Document 1).

REFERENCE DOCUMENT OF CONVENTIONAL ART

Patent Document

[Patent Document 1] JP1994-292240A (Particularly, see FIGS. 1-3)

DESCRIPTION OF THE DISCLOSURE

Problems to be Solved by the Disclosure

According to the conventional technology described above, since the operator can grasp the object three-dimensionally, an operability of the manipulator improves. Meanwhile, when the operator remotely manipulates a robot (manipulator) to perform a work, he/she may want to three-dimensionally see in detail the work target object, a working part of the robot, and a part of their surrounding (hereinafter, referred to as a "work area"). However, according to the conventional technology, since only an image within the entire field of view of a fixed stereo camera is displayed, the operator cannot three-dimensionally see a part of the work area in detail.

The present disclosure is made in view of solving the above problem, and one purpose thereof is to provide a robot system, which enables an operator to manipulate a robot body while three-dimensionally watching a part of a work area in detail.

SUMMARY OF THE DISCLOSURE

In order to achieve the purpose described above, a robot system according to one aspect of the present disclosure includes a robot body having a working part configured to perform a work, a robot manipulation device used by an operator to manipulate the robot body, a left-eye camera and a right-eye camera configured to capture a left-eye capturing image and a right-eye capturing image of a work area where the working part of the robot body performs the work, respectively, a stereoscopic display unit configured to display parallax images seen three-dimensionally by the operator with both eyes, an area manipulation device operated by the operator to specify a stereoscopic vision target area to be seen three-dimensionally through the parallax images displayed on the stereoscopic display unit, in an absolute space in a field of view common between the left-eye camera and the right-eye camera, a robot controlling module configured to control operation of the robot body according to the operation of the robot manipulation device, and a stereoscopic display controlling module configured to extract images corresponding to the stereoscopic vision target area specified by the operation of the area manipulation device, from the left-eye capturing image and the right-eye capturing image captured by the left-eye camera and the right-eye camera, respectively, and display the extracted images on the stereoscopic display unit as the parallax images. Here, the "absolute space" means a space where the left-eye camera and the right-eye camera exist, and a "position in the absolute space" is defined based on a given coordinate system, for example, a reference coordinate system of the robot body. The "left-eye camera and right-eye camera" mean a pair of cameras which has a pair of optical axes parallel to each other and having a given gap therebetween. "Fields of view of the left-eye camera and the right-eye camera" mean spaces within angles of view of the left-eye camera and the right-eye camera, respectively.

According to this configuration, when the operator operates the area manipulation device to specify the stereoscopic vision target area to be seen three-dimensionally through the parallax images displayed on the stereoscopic display unit, the stereoscopic display controlling module extracts the images corresponding to the stereoscopic vision target area specified by the operation of the area manipulation device, from the left-eye capturing image and the right-eye capturing image captured by the left-eye camera and the right-eye camera, respectively, and displays the extracted images on the stereoscopic display unit as the parallax images. Therefore, the operator can three-dimensionally see a desired part of the work area where the working part of the robot body performs the work in detail.

When the area manipulation device is not operated, the stereoscopic display controlling module may extract images of the stereoscopic vision target area in the absolute space corresponding to a position of the working part of the robot body, from the left-eye capturing image and the right-eye capturing image captured by the left-eye camera and the right-eye camera, respectively, and display the extracted images on the stereoscopic display unit as the parallax images of an initial setting.

According to this configuration, for example, at the start of the work, by displaying the image of the stereoscopic vision target area in the absolute space corresponding to the position of the working part of the robot body as the parallax images of the initial setting, the image of the stereoscopic vision target area in the absolute space corresponding to the position of the working part of the robot body is displayed so as to follow the operation of the robot body. Therefore, the operator can promptly and three-dimensionally see the desired part of the work area where the working part of the robot body performs the work in detail, by operating the area manipulation device while manipulating the robot body with the robot manipulation device.

The stereoscopic display unit displays the parallax images of only very small stereoscopic vision target area in the work area. Therefore, when an area far away from the stereoscopic vision target area currently displayed is desired to be displayed as the stereoscopic vision target area, a direction in which the stereoscopic vision target area should be moved is undecidable in some cases. According to this configuration, when the area manipulation device is not operated due to such reasons, the image of the stereoscopic vision target area in the absolute space corresponding to the position of the working part of the robot body is displayed on the stereoscopic display unit as the parallax images of the initial setting. Therefore, by moving the stereoscopic vision target area from the initial setting as a start point, the area far away from the currently displayed stereoscopic vision target area can be easily displayed as the stereoscopic vision target area.

The area manipulation device may be operated to adjust at least one of the size of the stereoscopic vision target area, a position of the stereoscopic vision target area, a parallax of the parallax images, and an enlargement and a reduction in size of the parallax images. According to the manipulation of the area manipulation device, the stereoscopic display controlling module may execute image processing of the left-eye capturing image and the right-eye capturing image, and display, on the stereoscopic display unit, the parallax images in which at least one of the size of the stereoscopic vision target area, the position of the stereoscopic vision target area, the parallax of the parallax images, and the enlargement and the reduction in size of the parallax images is adjusted.

According to this configuration, the desired part of the work area where the working part of the robot body performs the work can be seen three-dimensionally in detail, in the desired mode.

An angle of view of each of the left-eye camera and the right-eye camera may be 150° or above and 360° or below.

According to this configuration, even when the work area where the working part of the robot body performs the work is wide, the desired part of the work area can be seen three-dimensionally in detail.

The stereoscopic display controlling module may correct the images extracted from the left-eye capturing image and the right-eye capturing image so as to remove image distortion caused by wide-angle lenses, and display the corrected images on the stereoscopic display unit as the parallax images.

According to this configuration, a part of the wide work area can be seen three-dimensionally in detail based on the parallax images with the distortion level almost the same as an image captured by a standard lens.

A plurality of pairs of the left-eye camera and the right-eye camera may be disposed surrounding the work area where the working part of the robot body performs the work, and the stereoscopic display controlling module may display, on the stereoscopic display unit, the parallax images corresponding to a selected pair of the left-eye camera and the right-eye camera.

According to this configuration, the operator can three-dimensionally see the desired part of the work area in detail as if he/she circles around the peripheral of the work area.

Effect of the Disclosure

According to the present disclosure, a robot system which enables an operator to manipulate a robot body while three-dimensionally watching a part of a work area in detail, can be provided.

MODES FOR CARRYING OUT THE DISCLOSURE

Figure 1:
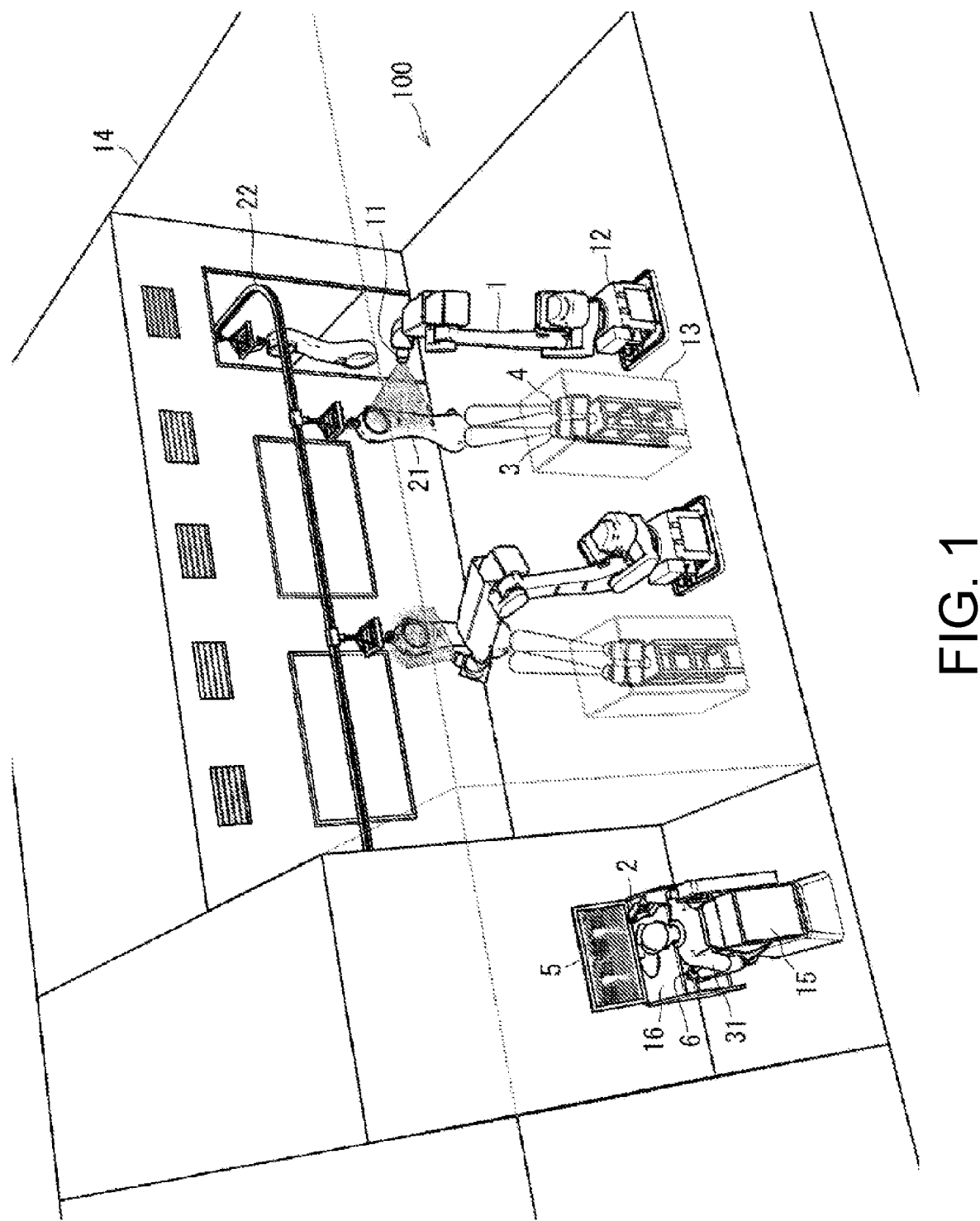
FIG. 1 is a perspective view illustrating one example of a configuration of hardware of a robot system and a work environment of the robot system according to Embodiment 1 of the present disclosure.

Hereinafter, desirable embodiments of the present disclosure will be described with reference to the accompanying drawings. Note that, below, the same reference characters are assigned to the same or corresponding elements throughout the drawings to omit redundant description. Moreover, since the drawings are to illustrate the present disclosure, elements irrelevant to the present disclosure may be omitted, the dimension may be inaccurate for exaggeration and simplification, or a plurality of drawings may not correspond to each other. Moreover, the present disclosure is not limited to the following embodiments.

Embodiment 1

[Configuration]

Figure 2:
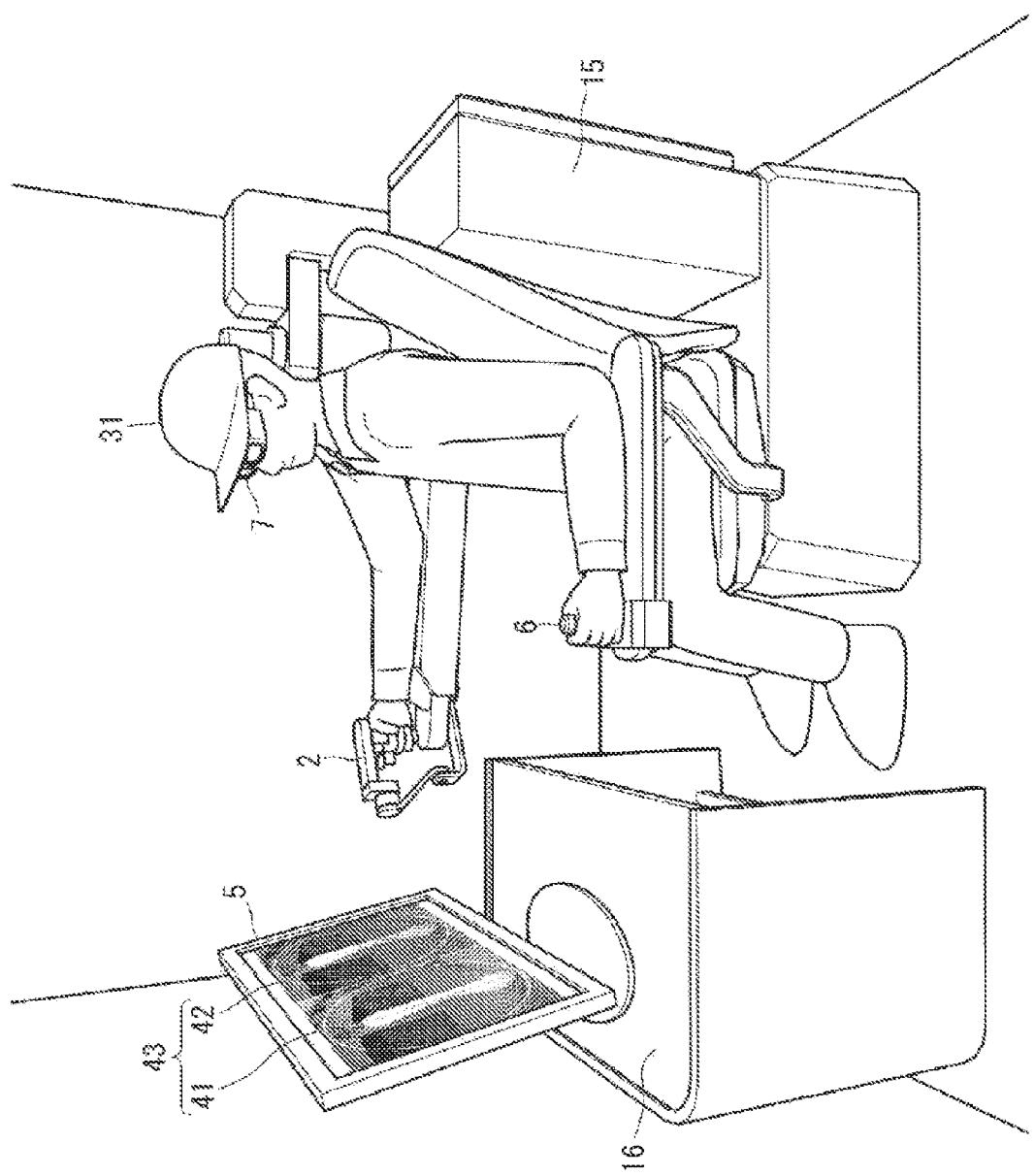
FIG. 2 is a perspective view illustrating a situation where an operator manipulates a robot body, and performs a manipulation for specifying a stereoscopic vision target area to be seen three-dimensionally in detail.
Figure 3:
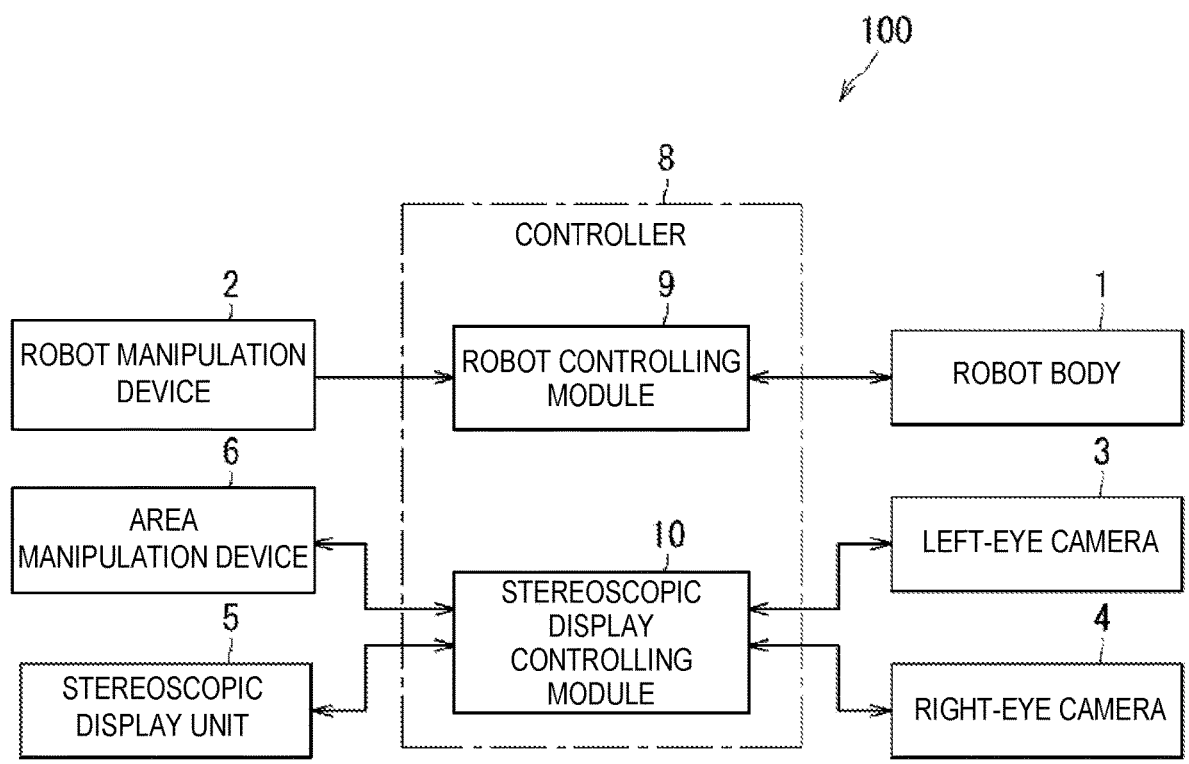
FIG. 3 is a functional block diagram illustrating one example of a configuration of a control system of the robot system illustrated in FIG. 1.

FIG. 1 is a perspective view illustrating one example of a configuration of hardware of a robot system and a work environment of the robot system according to Embodiment 1 of the present disclosure. FIG. 2 is a perspective view illustrating a situation where an operator manipulates a robot body, and performs a manipulation for specifying a stereoscopic vision target area to be seen three-dimensionally in detail. FIG. 3 is a functional block diagram illustrating one example of a configuration of a control system of the robot system illustrated in FIG. 1. FIGS. 4(a) to 4(d) are schematic views schematically illustrating modes of adjusting the stereoscopic vision target area to be seen three-dimensionally in detail. FIG. 5 is a schematic view illustrating a relation between fields of view of a left-eye camera and a right-eye camera, and the stereoscopic vision target area to be seen three-dimensionally in detail by the operator.

Referring to FIGS. 1 to 5, a robot system 100 according to this embodiment is provided with a robot body 1 having a working part 11 which performs a work, a robot manipulation device 2 used by an operator 31 to manipulate the robot body 1, a left-eye camera 3 and a right-eye camera 4 which capture a left-eye capturing image and a right-eye capturing image of a work area where the working part 11 of the robot body 1 performs the work, respectively, a stereoscopic display unit 5 which displays parallax images 43 to be seen three-dimensionally by the operator 31 with both eyes, an area manipulation device 6 operated by the operator 31 to specify a stereoscopic vision target area 50 which is to be seen three-dimensionally through the parallax images 43 displayed on the stereoscopic display unit 5 and is in an absolute space in a field of view 23 common between the left-eye camera 3 and the right-eye camera 4, a robot controlling module 9 which controls the operation of the robot body 1 according to the manipulation of the robot manipulation device 2, and a stereoscopic display controlling module 10 which extracts images 51 and 52 corresponding to the stereoscopic vision target area 50 specified by the manipulation of the area manipulation device 6 from the left-eye capturing image and the right-eye capturing image captured by the left-eye camera 3 and the right-eye camera 4, respectively, and displays the extracted images 51 and 52 on the stereoscopic display unit 5 as the parallax images 43. Hereinafter, the configuration of the robot system 100 is described in detail.

<Configuration of Hardware>

Referring to FIGS. 1 and 2, the robot system 100 is provided with the robot body 1, the robot manipulation device 2, the left-eye camera 3, the right-eye camera 4, the stereoscopic display unit 5, the area manipulation device 6, and stereoscopic glasses 7. Referring to FIG. 3, the robot system 100 further includes a controller 8. The controller 8 includes the robot controlling module 9 and the stereoscopic display controlling module 10. A pair of the left-eye camera 3 and the right-eye camera 4 is provided corresponding to one robot body 1. Hereinafter, these components are described in detail in order.

{Robot Body 1}

The robot body 1 is provided with the working part 11. The working part 11 is configured at least to perform a given work. The working part 11 may be an end effector, for example. Examples of the end effector include a hand, a painting gun, a welding gun, and a nut runner. Here, the working part 11 is the painting gun. The robot body 1 and the robot controlling module 9 constitute a robot. The robot is defined as, for example, "an intelligent machine system having three elemental technologies of a sensor, an intelligence/control system, and a drive system," (see "Summary of WHITE PAPER Information and Communications in Japan," the Japanese Ministry of Internal Affairs and Communications, 2015). In detail, the robot body 1 is comprised of, for example, an industrial robot, such as a vertical articulated robot, a horizontal articulated robot, a parallel link robot, a polar coordinates robot, a cylindrical coordinates robot, and a rectangular coordinates robot. Below, a case where the robot body 1 is comprised of a robotic arm of a vertical articulated robot is illustrated.

{Manipulation Device 2}

The manipulation device 2 may be any device, as long as it can manipulate the robot body 1 (including the working part 11). For example, the manipulation device 2 may be constituted by a master robot having a similar shape to the robot body 1, and the robot body 1 may be controlled as a slave robot. Alternatively, the manipulation device 2 may be a joystick. Moreover, the manipulation device 2 may be a manipulation device for exclusive use customized by a specific application. Here, the manipulation device 2 is comprised of one for exclusive use customized as illustrated in FIG. 2.

{Left-Eye Camera 3 and Right-Eye Camera 4}

Referring to FIGS. 1 and 5, the left-eye camera 3 and the right-eye camera 4 are comprised of digital cameras or analog cameras. The left-eye camera 3 and the right-eye camera 4 are disposed so that optical axes 3b and 4b of the respective cameras are parallel to each other having a given gap therebetween. Moreover, the left-eye camera 3 and the right-eye camera 4 are disposed so as to be able to image the work area where the working part 11 of the robot body 1 performs a work to a work target object 21. The left-eye camera 3 and the right-eye camera 4 have given angles of view (fields of view) 3a and 4a, respectively. Each of the angles of view 3a and 4a of the left-eye camera 3 and the right-eye camera 4 is, for example, 150° or above and 360° or below. Although areas (fields of view) in the absolute space which can be imaged increase as the angles of view 3a and 4a increase, distortion of the captured images (the captured images curve more in a part closer to the peripheral) increase.

{Stereoscopic Display Unit 5}

Referring to FIGS. 1 and 2, the stereoscopic display unit 5 is comprised of, for example, a panel display. The panel display may be a known panel display. The stereoscopic display unit 5 is installed near the robot manipulation device 2 so that the operator can easily watch.

{Area Manipulation Device 6}

Referring to FIGS. 2 and 5, the area manipulation device 6 may be any device, as long as it can be operated to specify the stereoscopic vision target area 50 in the absolute space in the field of view 23 which is common between the left-eye camera 3 and the right-eye camera 4. Note that the shape of the stereoscopic vision target area 50 is arbitrary. In detail, when the operator 31 operates the area manipulation device 6, the area manipulation device 6 outputs area specifying information including a position (e.g., a representative position) of the stereoscopic vision target area 50 in the absolute space, as an area manipulating signal. The area manipulation device 6 is comprised of, for example, a joystick. The area manipulation device 6 comprised of the joystick can be tilted in an arbitrary direction. The joystick is provided at its tip-end part with a forward button (not illustrated) and a rearward button (not illustrated). The joystick is further provided at its tip-end part with a plurality of buttons to control a mode of the stereoscopic vision target area (hereinafter, referred to as "area mode controlling buttons" (not illustrated)). The forward button, the rearward button, and the area mode controlling buttons are configured to be operated by the operator 31 with a thumb while the area manipulation device 6 is gripped by his/her hand, and pressed down according to a pressing force. Note that, in FIG. 2, the area manipulation device 6 is illustrated in a mode where the forward button, the rearward button, and the area mode controlling buttons are omitted for simplification.

The robot controlling module 9 has a reference coordinate system of the robot body 1 (hereinafter, simply be referred to as a "reference coordinate system"). The stereoscopic display controlling module 10 shares this reference coordinate system, and identifies a position in the absolute space based on this reference coordinate system. Hereinafter, the "position in the absolute space" means a position in the space defined based on the reference coordinate system. When the area manipulation device 6 takes an upright posture, the position of the stereoscopic vision target area 50 specified by the area manipulation device 6 in the absolute space does not move. When the area manipulation device 6 is operated to be tilted, the stereoscopic vision target area 50 is moved in the absolute space according to an amount of tilt of the area manipulation device 6, assuming that extending directions of the optical axes of the left-eye camera 3 and the right-eye camera 4 correspond to a direction of the area manipulation device 6 from its tip-end part to its base-end part. Moreover, when the forward button or the rearward button of the area manipulation device 6 is pressed down, the stereoscopic vision target area 50 moves forward or backward according to an amount of pressing down of the forward button or the rearward button, assuming that the extending directions of the optical axes of the left-eye camera 3 and the right-eye camera 4 correspond to a pressing-down direction of the forward button.

An initial setting position is set for the stereoscopic vision target area 50. This initial setting position serves as a reference position of the stereoscopic vision target area 50 in the absolute space corresponding to the position of the working part 11 of the robot body 1. The image of the stereoscopic vision target area 50 at this initial setting position is displayed on the stereoscopic display unit 5 as the parallax images 43 of an initial setting corresponding to the position of the working part 11 of the robot body 1. This initial setting position is suitably set according to the content of the work. Here, for example, the initial setting position is set at a position separated by a given distance in a direction the painting gun 11 injects paint. This "given distance" is set to, for example, a distance suitable for painting the work target object 21.

When the operator 31 operates the area mode controlling buttons, area specifying information on other than the position of the stereoscopic vision target area 50 is outputted as the area manipulating signal. The area specifying information on other than the position of the stereoscopic vision target area 50 will be described later in detail.

{Stereoscopic Glasses 7}

Referring to FIG. 2, commercially available glasses may be used for the stereoscopic glasses 7. The stereoscopic glasses 7 are configured so that optical filters are attached to a frame instead of lenses of normal glasses. As the optical filter, polarizing filter (polarizer), a liquid crystal shutter, etc., may be used. When the polarizing filter is used, waveplates which produce circular polarization are attached to a display screen of the stereoscopic display unit 5 so that a rotating direction of the circular polarization becomes alternate for every scan line, and odd scan lines and even scan lines display a left-eye image 41 and a right-eye image 42, respectively. Left and right polarizing filters which can only transmit circular polarization corresponding to the left-eye image 41 and the right-eye image 42, respectively, are attached to the stereoscopic glasses 7.

When the liquid crystal shutter is used, the stereoscopic display unit 5 is driven at a high speed, and the left-eye image 41 and the right-eye image 42 are alternately displayed in a time division manner. Left and right liquid crystal shutters are opened and closed so as to synchronize with the time-division display.

{Controller 8}

The controller 8 includes, for example, a processor and a memory. The controller 8 controls operation of the robot body 1 and controls the stereoscopic display on the stereoscopic display unit 5 by the processor reading and executing a given operation program stored in the memory. In detail, the controller 8 is comprised of, for example, a microcontroller, an MPU, an FPGA (Field Programmable Gate Array), a PLC (Programmable Logic Controller), or a logic circuit.

The controller 8 includes the robot controlling module 9 and the stereoscopic display controlling module 10. As described above, the robot controlling module 9 and the stereoscopic display controlling module 10 are functional blocks implemented by the processor reading and executing a given operation program stored in the memory.

The controller 8 is comprised of a sole controller which executes a centralized control, or a plurality of controllers which execute a distributed control. Here, although the controller 8 is comprised of a sole controller, the controller 8 may be comprised of two controllers so that these two controllers implement the robot controlling module 9 and the stereoscopic display controlling module 10, respectively.

The controller 8 may be installed at an arbitrary place. The controller 8 may be installed, for example, inside a pedestal 12 which supports the robot body 1.

<Configuration of Control System>

Referring to FIG. 3, when the operator 31 operates the robot manipulation device 2, the robot manipulation device 2 outputs a robot manipulating signal to the robot controlling module 9. The robot controlling module 9 controls the operation of the robot body 1 according to the inputted robot manipulating signal. Thus, when the operator 31 operates the manipulation device 2, the robot body 1 operates according to the manipulation. The robot controlling module 9 has the reference coordinate system as described above, and identifies the position of the robot body 1 based on the reference coordinate system so as to control the operation of the robot body 1.

The stereoscopic display controlling module 10 controls operation of the left-eye camera 3 and the right-eye camera 4, such as ON/OFF and focusing operation. The left-eye camera 3 and the right-eye camera 4 capture the work area where the working part 11 of the robot body 1 performs the work to the work target object 21, and output the imaged left-eye capturing image 61 and right-eye capturing image 62 (see FIG. 6) to the stereoscopic display controlling module 10, respectively. Moreover, when the operator 31 operates the area manipulation device 6, the area manipulation device 6 outputs the area manipulating signal to the stereoscopic display controlling module 10. The stereoscopic display controlling module 10 executes image processing to the inputted left-eye capturing image 61 and right-eye capturing image 62 according to the inputted area manipulating signal so as to generate the parallax images 43. Then, the stereoscopic display controlling module 10 outputs to the stereoscopic display unit 5 an image displaying signal for displaying the generated parallax images.

The stereoscopic display unit 5 displays the parallax images 43 according to the inputted image displaying signal. Here, the left-eye image 41 and the right-eye image 42 constituting the parallax images 43 are displayed next to each other on the display screen. Note that the left-eye image 41 and the right-eye image 42 may be displayed overlapping with each other on the display screen.

Moreover, when the area manipulation device 6 is not operated, the stereoscopic display controlling module 10 displays, on the stereoscopic display unit 5, the parallax images 43 of the initial setting corresponding to the position of the working part 11 of the robot body 1. Therefore, the parallax images 43 can be displayed so as to follow the operation of the robot body 1. However, in order not to interrupt the operator 31 to operate the area manipulation device 6 to select the stereoscopic vision target area 50, the parallax images 43 of the initial setting corresponding to the position of the working part (painting gun) 11 of the robot body 1 is displayed only when a given condition is satisfied as well as when the area manipulation device 6 is not operated.

Here, a given first condition is defined to be a start timing of the work. According to this condition, since the image of the stereoscopic vision target area 50 in the absolute space corresponding to the position of the working part 11 of the robot body 1 is displayed as the parallax images 43 of the initial setting when the work starts, the image of the stereoscopic vision target area 50 in the absolute space corresponding to the working part (painting gun) 11 of the robot body 1 is displayed so as to follow the operation of the robot body 1. Therefore, the operator 31 can promptly and three-dimensionally see a desired part of the work area where the working part 11 of the robot body 1 performs the work in detail, by operating the area manipulation device 6 while manipulating the robot body 1 by the robot manipulation device 2.

Moreover, a given second condition is defined that the area manipulation device 6 is not operated for a given period of time. The "given period of time" is suitably determined through a calculation, an experiment, a simulation, etc. According to this configuration, following operation and effects are achieved.

The stereoscopic display unit 5 displays the parallax images 43 of only very small stereoscopic vision target area 50 in the work area of the robot body 1. Therefore, when an area far away from the stereoscopic vision target area 50 currently displayed is desired to be displayed as the stereoscopic vision target area, a direction in which the stereoscopic vision target area should be moved is undecidable in some cases. According to this configuration, when the area manipulation device 6 is not operated for the given time period due to the reason as described above, the image of the stereoscopic vision target area 50 in the absolute space corresponding to the position of the working part 11 (painting gun) of the robot body 1 is displayed on the stereoscopic display unit 5 as the parallax images of the initial setting. Therefore, by moving the stereoscopic vision target area 50 from the initial setting of the parallax images 43 as a start point, the area far away from the stereoscopic vision target area 50 currently displayed can be easily displayed as the stereoscopic vision target area 50.

[Work Environment]

Referring to FIG. 1, the robot system 100 is installed, for example, inside a work room 14. In FIG. 1, the work room 14 is illustrated to be see-through for convenience. A lift 22 which hangs the work target object 21 and transfers it, is provided passing through an upper part of the work room 14. The work target object 21 is, for example, a link member which constitutes a robotic arm of an articulated robot. For example, two robot systems 100 are disposed along the lift 22. The robot body 1 of each robot system 100 is comprised of a vertical articulated robot, and a painting gun is attached to a tip-end part of the robot body 1 as the working part 11. That is, in this work room 14, the link member transferred by the lift 22 as the work target object 21 is painted by the robot body 1. Then, an area including the work target object 21 which moves by the time the painting work by the robot body 1 finishes, the surrounding of the work target 21, and the working part 11 of the robot body 1, is the work area. The robot body 1 is provided on the pedestal 12.

The pair of the left-eye camera 3 and the right-eye camera 4 are disposed next to the robot body 1. The pair of the left-eye camera 3 and the right-eye camera 4 are disposed on a placing stand, so that the optical axes pass an area where the work target object 21 hung from the lift 22 passes through. In other words, the pair of the left-eye camera 3 and the right-eye camera 4 are disposed so that the work area where the working part (painting gun) 11 of the robot body 1 works is within their fields of view (angles of view). The pair of the left-eye camera 3 and the right-eye camera 4, and the placing stand are accommodated in a transparent case 13 so as not to be painted.

An operation desk 16 and an operation chair 15 are disposed in a room next to the work room 14. Although these operation desk 16 and operation chair 15 are provided for each robot system 100, only the operation desk 16 and the operation chair 15 corresponding to one robot system 100 is illustrated in FIG. 1.

Referring to FIGS. 1 and 2, for example, the robot manipulation device 2 is provided to a right-side part of the operation chair 15. Moreover, the area manipulation device 6 is provided to a left-side part of the operation chair 15. The operation desk 16 is placed in front of the operation chair 15. Then, the stereoscopic display unit 5 comprised of the panel display is placed on the operation desk 16. The operator 31 is seated on the operation chair 15, grips the robot manipulation device 2 by his/her right hand, and grips the area manipulation device 6 by his/her left hand. The operator 31 wears the stereoscopic glasses 7, and operates the robot manipulation device 2 and the area manipulation device 6 by his/her right hand and left hand, respectively, while three-dimensionally watching through the stereoscopic glasses 7 the parallax images 43 displayed on the stereoscopic display unit 5. Then, the robot body 1 operates according to the manipulation of the robot manipulation device 2, and the parallax images 43 are displayed on the stereoscopic display unit 5 according to the manipulation of the area manipulation device 6.

[Operation]

Figure 5:
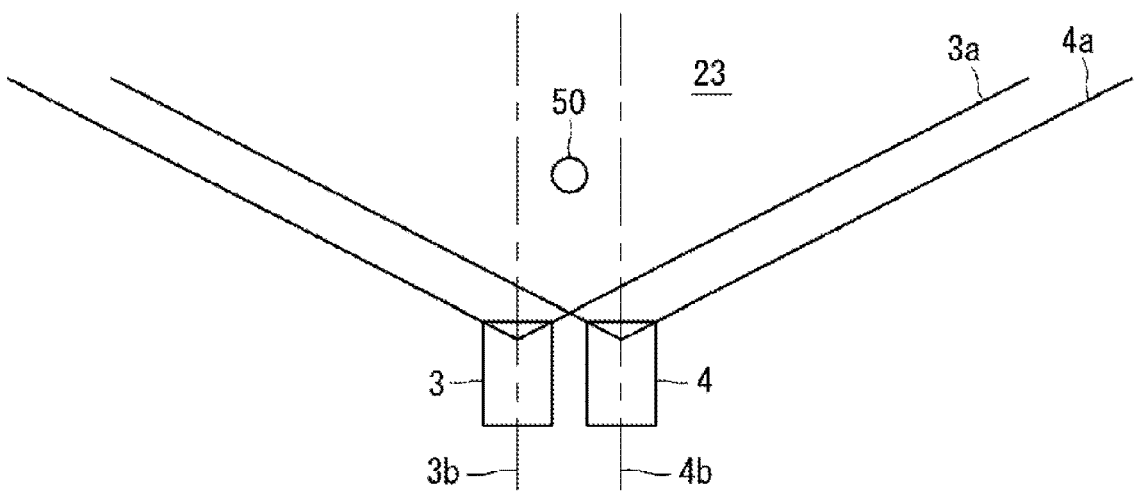
FIG. 5 is a schematic view illustrating a relation between fields of view of a left-eye camera and a right-eye camera, and the stereoscopic vision target area to be seen three-dimensionally in detail by the operator.
Figure 6:
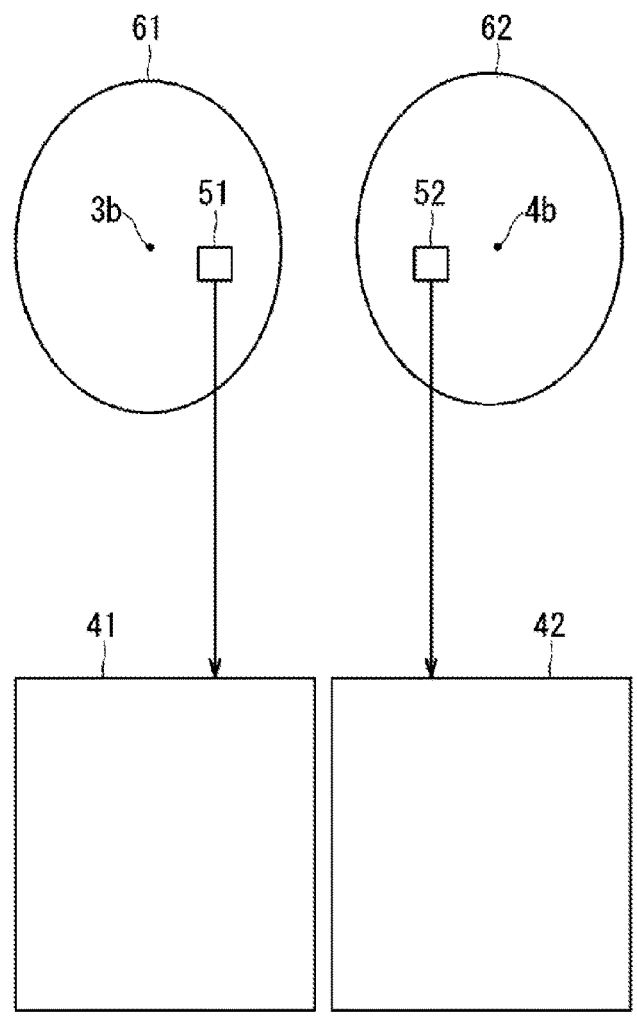
FIG. 6 is a schematic view schematically illustrating image processing to extract an image corresponding to the stereoscopic vision target area to be seen three-dimensionally in detail by the operator.

Next, the operation of the robot system 100 configured as described above is described with reference to FIGS. 1 to 6. FIG. 6 is a schematic view schematically illustrating image processing to extract an image corresponding to the stereoscopic vision target area to be seen three-dimensionally in detail by the operator.

When the work is started, the parallax images 43 of the stereoscopic vision target area 50 at the initial setting position are displayed on the stereoscopic display unit 5 as an initial setting image.

The operator 31 operates the area manipulation device 6 by his/her left hand while operating the robot manipulation device 2 by his/her right hand.

The operator 31, first, operates the area manipulation device 6 (and the forward button or the rearward button) so as to position the stereoscopic vision target area 50 at the desired position. Then, this positional information is outputted to the stereoscopic display controlling module 10 as the area manipulating signal.

Referring to FIG. 6, the image 51 and the image 52 corresponding to the stereoscopic vision target area 50 specified based on the positional information are extracted from the left-eye capturing image 61 and the right-eye capturing image 62, which are inputted from the left-eye camera 3 and the right-eye camera, respectively. Then, these extracted image 51 and image 52 are corrected so that distortion of the images caused by wide-angle lenses is removed. Therefore, the image distortion of the extracted image 51 and image 52 becomes the distortion level almost the same as an image captured by a standard lens. Note that the degree of removing the image distortion by the correction is arbitrary, as long as the image distortion is corrected to the extent the operator 31 can visually and accurately recognize the target object of the stereoscopic vision.

The stereoscopic display controlling module 10 enlarges the pair of the corrected images to a given size so as to generate the left-eye image 41 and the right-eye image 42, and display these images on the stereoscopic display unit 5 as the parallax images 43. The operator 31 three-dimensionally sees the parallax images 43 through the stereoscopic glasses 7.

Figure 4:
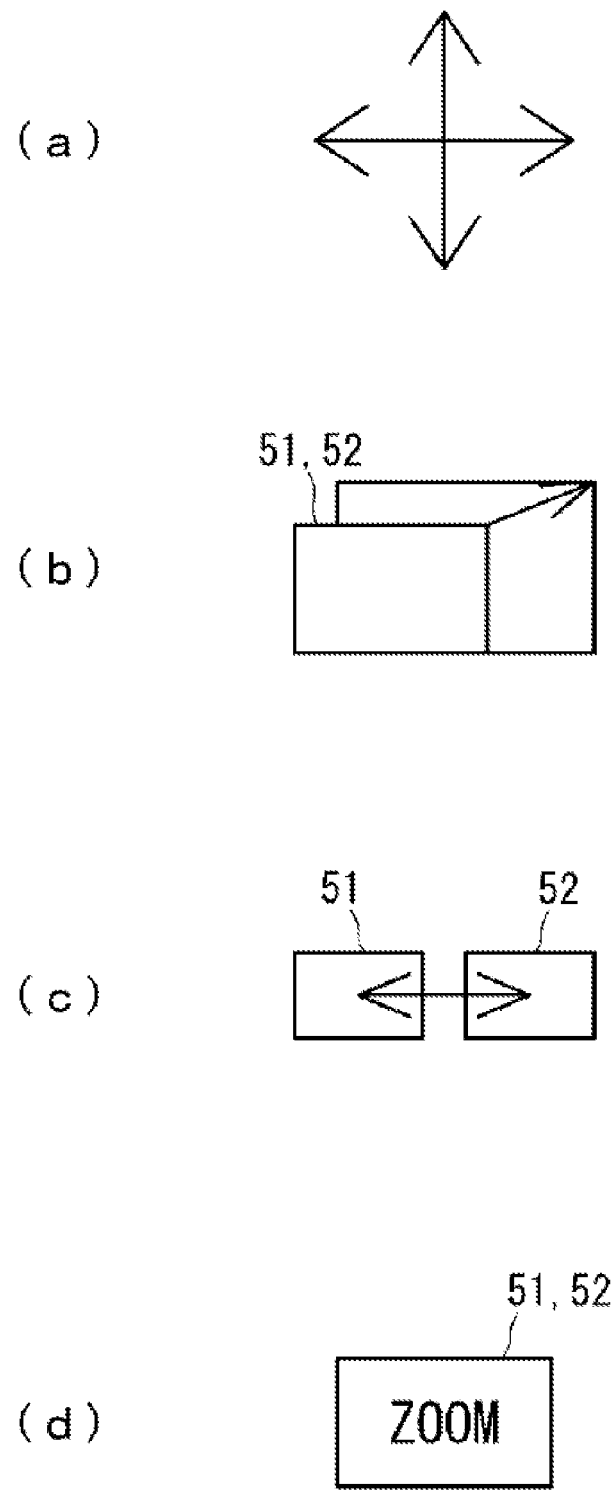
FIGS. 4(a) to 4(d) are schematic views schematically illustrating modes of adjusting the stereoscopic vision target area to be seen three-dimensionally in detail.

As illustrated in FIG. 4(*a*), when the operator 31 tilts the area manipulation device 6 in a desired direction, the operator 31 can three-dimensionally watch the desired direction in the work area of the robot body 1 in the field of view common between the pair of the left-eye camera 3 and the right-eye camera 4. Therefore, only by the operator 31 operating the area manipulation device 6, he/she can watch around the work area as if he/she looks around the work area like positioning his/her head at the position of the pair of the left-eye camera 3 and the right-eye camera 4 and turning the head in the up-and-down and left-and-right directions. Moreover, the desired partial area of the work area can be three-dimensionally seen in detail. Particularly, for example, when each angle of view (field of view) of the pair of the left-eye camera 3 and the right-eye camera 4 is 360°, the operator 31 can three-dimensionally watch the desired partial area of the work area in detail as if the operator 31 looks around the work area around him/her. Thus, the operability of the robot body 1 improves compared to the conventional technology.

Next, the operator 31 operates the plurality of area mode controlling buttons of the area manipulation device 6.

For example, as illustrated in FIG. 4(b), when the operator 31 operates an area mode controlling button for changing the stereoscopic vision target area 50, the stereoscopic display controlling module 10 changes the size of the stereoscopic vision target area 50 (in detail, the images 51 and 52 corresponding to the stereoscopic vision target area 50) when seen in the optical-axis direction of the pair of left-eye camera 3 and the right-eye camera 4, according to area specifying information for changing the size of the stereoscopic vision target area 50. Then, the stereoscopic display controlling module 10 displays, on the stereoscopic display unit, the parallax images 43 on which this change is reflected.

Moreover, as illustrated in FIG. 4(c), when the operator 31 operates an area mode controlling button for changing a parallax, the stereoscopic display controlling module 10 changes the parallax between the image 51 and the image 52 according to area specifying information for changing the parallax. Then, the stereoscopic display controlling module 10 displays, on the stereoscopic display unit 5, the left-eye image 41 and the right-eye image 42 on which this changed parallax is reflected.

Moreover, for example as illustrated in FIG. 4(d), when the operator 31 operates an area mode controlling button for zooming, the stereoscopic display controlling module 10 specifies the zooming of the image 51 and the image 52 according to area specifying information for specifying the zooming. Then, the stereoscopic display controlling module 10 displays, on the stereoscopic display unit 5, the left-eye image 41 and the right-eye image 42 which are enlarged or reduced in size according to the specified zooming. This zooming is a pseudo zooming and carried out by adjusting an enlarging rate of the image 51 and the image 52 illustrated in FIG. 6.

Accordingly, the desired part of the work area where the working part 11 of the robot body 1 performs the work can be seen three-dimensionally in detail, in the desired mode.

As described above, according to this embodiment, the operator 31 can three-dimensionally see the desired part of the work area where the working part 11 of the robot body 1 performs the work, in detail.

Embodiment 2

According to Embodiment 2 of the present disclosure, the pair of the left-eye camera 3 and the right-eye camera 4 are provided so as to be changeable of the directions of their optical axes in the robot system 100 of Embodiment 1. A device for changing the directions of the optical axes (not illustrated) can be comprised of a known posture changing device. Examples of the posture changing device include a small articulated robot, a driving device for a parabolic antenna, etc.

According to this embodiment, the operator 31 can three-dimensionally see the desired part of a wider work area of the robot body 1 in detail.

Embodiment 3

Embodiment 3 of the present disclosure is different from Embodiment 1 in terms of the following point, and the other points are similar to Embodiment 1. Below, the different point is described.

Figure 7:
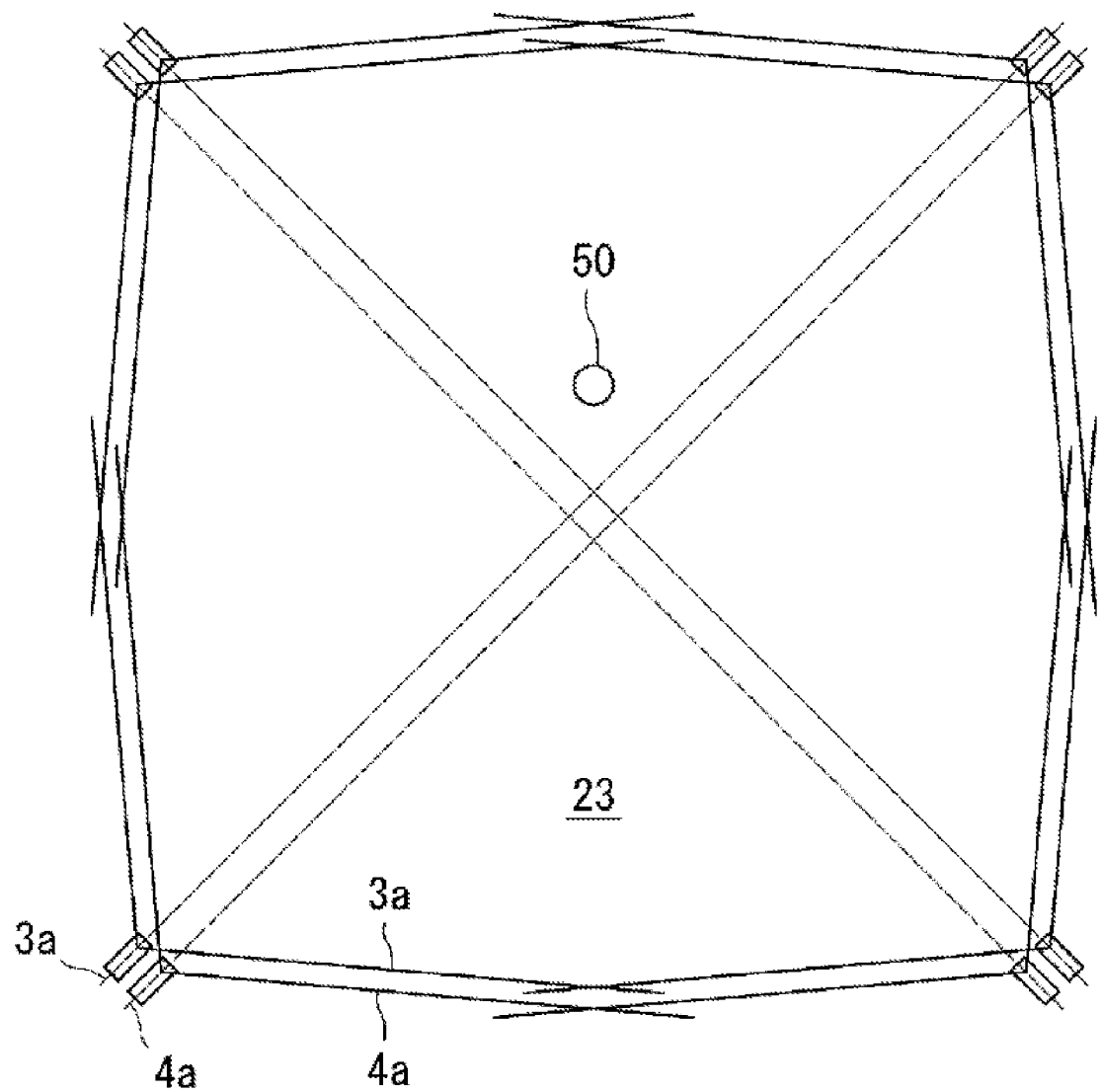
FIG. 7 is a schematic view illustrating relations between fields of view of a plurality of pairs of the left-eye camera and the right-eye camera and a stereoscopic vision target area to be seen three-dimensionally in detail by the operator according to Embodiment 3.

FIG. 7 is a schematic view illustrating relations between fields of view of a plurality of pairs of the left-eye camera and the right-eye camera and the stereoscopic vision target area to be seen three-dimensionally in detail by the operator according to Embodiment 3.

Referring to FIGS. 1 and 7, in the robot system 100 of Embodiment 3, a plurality of pairs (here, four pairs) of the left-eye camera 3 and the right-eye camera 4 are disposed. The plurality of pairs of the left-eye camera 3 and the right-eye camera 4 are disposed surrounding the work area (not illustrated in FIG. 7) where the working part (painting gun) 11 of the robot body 1 performs the work. The plurality of pairs of the left-eye camera 3 and the right-eye camera 4 are disposed so that the common field of view 23 of each pair of the left-eye camera 3 and the right-eye camera 4 is overlapped with that of the adjacent pair.

Referring to FIGS. 2 and 3, the area manipulation device 6 is provided with a camera selecting button which selects one pair from the plurality of pairs of the left-eye camera 3 and the right-eye camera 4. When the operator 31 operates the camera selecting button to select one pair, the stereoscopic display controlling module 10 displays, on the stereoscopic display unit 5, the parallax images 43 captured by the selected pair of the left-eye camera 3 and the right-eye camera 4.

Note that the stereoscopic display controlling module 10 may automatically switch the pair of the left-eye camera 3 and the right-eye camera 4 according to the position of the stereoscopic vision target area 50, and the parallax images 43 thereof may be displayed on the stereoscopic display unit 5. In this case, for example, the stereoscopic display controlling module 10 selects a pair of the left-eye camera 3 and the right-eye camera 4 which are closest to the stereoscopic vision target area 50 and of which the optical axes are the closest to the stereoscopic vision target area 50.

According to this embodiment, the operator 31 can three-dimensionally see the desired part of the work area in detail as if he/she circles around the peripheral of the work area. Therefore, the operability of the robot body 1 further improves.

Other Embodiments

In any one of Embodiments 1 to 3, the stereoscopic display unit 5 may be an HMD (Head Mounted Display) which is mounted on a head of the operator 31.

It is apparent for the person skilled in the art that many improvements and other embodiments are possible from the above description. Therefore, the above description is to be interpreted only as illustration.

INDUSTRIAL APPLICABILITY

The robot system of the present disclosure is useful as a robot system which enables an operator to manipulate a robot body while three-dimensionally watching a part of a work area in detail.

DESCRIPTION OF REFERENCE CHARACTERS

1 Robot Body
2 Robot Manipulation Device
3 Left-eye Camera
3a Angle of View
3b Optical Axis
4 Right-eye Camera
4a Angle of View
4b Optical Axis
5 Stereoscopic Display Unit
6 Area Manipulation Device
7 Stereoscopic Glasses
8 Controller
9 Robot Controlling Module
10 Stereoscopic Display Controlling Module
11 Working Part
12 Pedestal
13 Case
14 Work Room
15 Operation Chair
16 Operation Desk
21 Work Target Object
23 Lift
23 Field of View
31 Operator
41 Left-eye Image
42 Right-eye Image
43 Parallax Image
50 Stereoscopic Vision Target Area
51, 52 Image
61 Left-eye Capturing Image
62 Right-eye Capturing Image
100 Robot System

The invention claimed is:

1. A vision system comprising:
a robot body including an end effector that performs work and a robotic arm that moves the end effector;
a robot operation manipulator comprising a first joystick that is configured to receive a first input manipulation from an operator and output a robot manipulating signal that causes the robot body to operate according to the first input manipulation;
a left-eye camera and a right-eye camera that capture images of the end effector and a work target object on which the end effector performs the work;
a display that displays parallax images to be seen three-dimensionally by the operator using both eyes;
an optical filter that allows the parallax images displayed on the display to be seen three-dimensionally by the operator;
an area operation manipulator comprising a second joystick that is configured to receive a second input manipulation by the operator, specify a stereoscopic vision target area according to the second input manipulation, and output an area manipulating signal containing information of the stereoscopic vision target area, the stereoscopic vision target area specified by the area operation manipulator being an area that is located in an absolute space and that is to be seen three-dimensionally through the parallax images displayed on the display, the stereoscopic vision target area occupying only a portion of a field of view common between the left-eye camera and the right-eye camera;
first circuitry that controls operation of the robot body according to the robot manipulation signal received from the robot operation manipulator; and
second circuitry that (i) extracts, according to the area manipulating signal received from the area operation manipulator, images corresponding to the stereoscopic vision target area specified by the operation of the area operation manipulator, from a left-eye capturing image and a right-eye capturing image captured by the left-eye camera and the right-eye camera, respectively, one of the extracted images being a partial image of the left-eye capturing image, the other of the extracted images being a partial image of the right-eye capturing image, and (ii) displays the extracted partial images on the display as the parallax images, wherein when the area operation manipulator is not operated for a predetermined amount of time, the display displays the parallax images of an initial setting corresponding to a position of the end effector of the robot body.

2. The vision system of claim 1, wherein:
the area operation manipulator is operated to adjust at least one of a size of the stereoscopic vision target area, a position of the stereoscopic vision target area, a parallax of the parallax images, or a zooming in or out of the parallax images, and
according to the operation of the area operation manipulator, the second circuitry executes image processing of the left-eye capturing image and the right-eye capturing image, or controls image capturing operation of the left-eye camera and the right-eye camera, and displays, on the display, the parallax images in which at least one of the size of the stereoscopic vision target area, the position of the stereoscopic vision target area, the parallax of the parallax images, or the zooming in or out of the parallax images is adjusted.

3. The vision system of claim 1, wherein an angle of view of each of the left-eye camera and the right-eye camera in a plane extending along an optical axis of the left-eye camera and an optical axis of the right-eye camera is 150° or above and 360° or below.

4. The vision system of claim 3, wherein the second circuitry corrects the images extracted from the left-eye capturing image and the right-eye capturing image so as to remove image distortion caused by wide-angle lenses, and displays the corrected images on the display as the parallax images.

5. The vision system of claim 1, wherein pairs of the left-eye camera and the right-eye camera are disposed surrounding the robot body, and the second circuitry displays, on the display, the parallax images corresponding to a selected pair of the left-eye camera and the right-eye camera.

6. The vision system of claim 1, wherein an optical axis of the left-eye camera and an optical axis of the right-eye camera are parallel when capturing the images.

* * * * *